United States Patent
Drott et al.

(12) 
(10) Patent No.: US 6,516,701 B1
(45) Date of Patent: Feb. 11, 2003

(54) BRAKE POWER BOOSTER AND A METHOD FOR CONTROLLING THE SAME

(75) Inventors: Peter Drott, Frankfurt am Main (DE); Michael Vogt, Simmern (DE); Hans-Jörg Feigel, Rosbach (DE); Jose Gonzales, Idstein (DE); Horst Krämer, Ginsheim (DE); Thorsten Neu, Löhnberg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/601,780

(22) PCT Filed: Feb. 4, 1999

(86) PCT No.: PCT/EP99/00721
§ 371 (c)(1),
(2), (4) Date: Oct. 27, 2000

(87) PCT Pub. No.: WO99/39958
PCT Pub. Date: Aug. 12, 1999

(30) Foreign Application Priority Data

| Feb. 7, 1998 | (DE) | 198 04 936 |
| Sep. 11, 1998 | (DE) | 198 41 879 |

(51) Int. Cl.[7] .................................................. F15B 9/09
(52) U.S. Cl. .................... 91/367; 303/154; 303/199
(58) Field of Search ........................ 91/367, 376 R; 303/154, 155, 199

(56) References Cited

U.S. PATENT DOCUMENTS 3,856,105 A * 12/1974 Lewis et al. .............. 180/169
5,460,074 A * 10/1995 Balz et al. ................. 91/376 R

FOREIGN PATENT DOCUMENTS

| DE | 43 24 688 | 1/1995 |
| DE | 44 32 583 | 9/1995 |
| DE | 195 08 822 | 9/1996 |
| DE | 195 19 874 | 12/1996 |

* cited by examiner

Primary Examiner—F. Daniel Lopez
(74) Attorney, Agent, or Firm—Rader, Fishman & Grauer PLLC

(57) ABSTRACT

The present invention relates to a brake force booster for automotive vehicles which includes a booster housing whose interior space is subdivided by a movable wall into a working chamber and a vacuum chamber, and a control housing which carries the movable wall and in which a control valve is arranged for controlling a pressure differential that acts upon the movable wall, the said control valve being operable by an operating rod by way of a valve piston and by an electromagnet. According to the present invention, the brake force booster is characterized in that the electromagnet is actuatable in dependence on the relative displacement between the valve piston and the control housing detected by a sensor. This arrangement makes possible a very simple control of a brake assist function because the signal of the sensor can be used both for the activation and the deactivation of the electromagnet. This means that the brake assist function can be triggered and/or terminated only on the basis of the signals of one single sensor.

11 Claims, 3 Drawing Sheets

BRAKE POWER BOOSTER AND A METHOD FOR CONTROLLING THE SAME

TECHNICAL FIELD

The present invention relates to a brake force booster for automotive vehicles and more particularly relates to a brake force booster that is actuatable by way of an operating rod, by way of a valve piston coupled to an electromagnet.

BACKGROUND OF THE INVENTION

A brake force booster of this type is disclosed in international patent application WO 94/11226, for example. In this prior art brake force booster, the working chamber can be ventilated independently of the position of the brake pedal or of the operating rod connected to the brake pedal by activation of the electromagnet. A corresponding actuation of the electromagnet permits achieving a so-called 'brake assist system' which, in the case of an emergency braking, will provide the full boosting force even if the driver does not apply the brake pedal with the pedal force that is required for response of an ABS control system. To this end, the speed of the brake pedal application is sensed e.g. by way of a pedal travel sensor with a subsequent signal differentiation. As soon as the actuating speed of the brake pedal exceeds a predetermined value, braking with full boosting effect is initiated by activation of the electromagnet. A separate release switch is integrated in the conventional brake force booster to deactivate the brake assist system. The release switch will deactivate the brake assist system as soon as the driver releases the brake pedal. However, a concept of this type necessitates relatively great efforts in terms of construction and circuitry due to the pedal travel sensor with a corresponding signal differentiation and due to the additional release switch with the associated trigger mechanism.

An object of the present invention is to provide a brake force booster with an electrical independent actuation which is structurally simplified and easy to actuate electrically, and a method of the booster's actuation.

According to the present invention, a brake force booster of the initially mentioned type is characterized in that there is provision of a sensor which detects the relative displacement between the valve piston and the control housing, and the electromagnet is activated and controlled in dependence thereon.

The brake force booster of the present invention makes possible a very simple control of the brake assist function because the signals of the sensor can be used both for the activation and the deactivation of the electromagnet. This means that a brake assist function can be triggered, and also terminated, only on the basis of the signals of one single sensor. To initiate the operation of the brake assist system, no pedal travel sensor with a complicated signal differentiation is necessary, which is in contrast to conventional designs. The activation of the electromagnet can be effected when a predetermined first relative displacement between the valve housing and the control housing is exceeded and can be detected in a simple way by a correspondingly designed sensor. The termination of the brake assist function can also take place on the basis of the sensor signals by deactivating, for example, the electromagnet when the amount of displacement falls below a predetermined second relative displacement. Thus, there is no need for a release switch along with its complicated actuation mechanism that is used in conventional electrically assisted brake force boosters. Cost reductions are made possible thereby.

A suitable embodiment of the present invention is characterized in that the actuating current of the electromagnet in the activated condition is variable in response to the relative displacement detected by the sensor. This permits precisely controlling the braking pressure also in the brake assist mode. The driver is thereby enabled to controlledly reduce the braking pressure by correspondingly releasing the brake pedal, without abruptly interrupting the brake assist function. It is this way possible to optimize the withdrawal from the brake assist mode which occurs suddenly in conventional brake force boosters, and to make it largely imperceptible to the driver.

The first relative displacement predetermined for the activation of the electromagnet may be a fixed value selectable in conformity with requirements. However, it may also be variable in dependence on the vehicle deceleration and/or the vehicle speed and/or the braking pressure and/or the time which has passed after the moment of pedal application. This permits optimally adapting the activation of the brake assist system to different driving situations.

The sensor for detecting the relative displacement between the valve piston and the control housing is suitably a non-contact sensor. It may e.g. be a Hall element, an incremental travel pickup, a linear potentiometer, or a like element. In a structurally favorable design, for example, a first sensor element is arranged on a guide member connected to the valve piston, and a second sensor element is arranged on the inside wall of a member which is rigidly connected to the control housing. However, it is also possible to arrange the sensor elements in other locations where a relative displacement between the control housing and the valve piston or other parts of the brake force booster which are moved along with the control housing or the valve piston can be detected.

A particularly simple and expedient electric circuit for activation and deactivation of the electromagnet in dependence on the signals of a sensor which detects the relative displacement between the valve piston and the control sleeve comprises two comparators for actuation of two relays that are connected in series to the electromagnet. One comparator is set to a low value of a relative displacement which corresponds to a disconnecting threshold, and the second comparator is set to a high value thereof which corresponds to a connecting threshold. Only the first comparator is enabled in the ready position of the brake force booster in which the disconnecting threshold is exceeded. When the connecting threshold is reached upon a quick brake application, the second comparator will also become enabled and the magnet for switching on the brake assist system is activated. Additionally, a self-holding function is activated so that the brake assist function will only be discontinued when the disconnecting threshold is reached. A circuit of this type requires only a supply voltage of e.g. 12 volt and can even be integrated in the construction unit of the brake force booster.

Further special characteristics and advantages of the present invention can be taken from the following description of favorable embodiments making reference to the accompanying drawings.

DETAILED DESCRIPTION OF THE PREFERRED EMBODIMENTS

Figure 1:
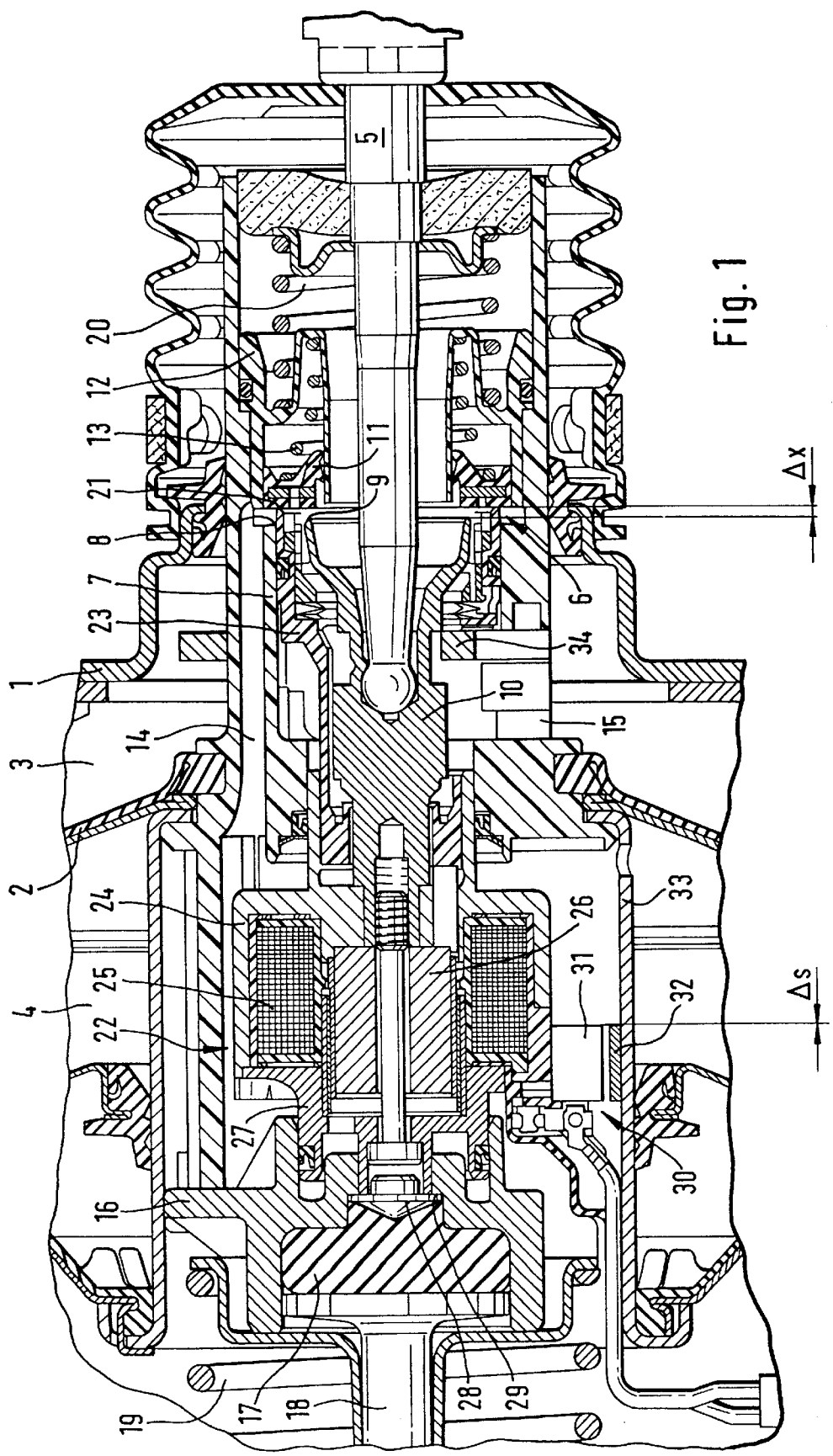
FIG. 1 is a partial longitudinal cross-sectional view of a brake force booster with an activated brake assist system according to the present invention.

In the vacuum brake force booster which is shown in part in the embodiment of FIG. 1, a booster housing 1 is subdivided into a working chamber 3 and a vacuum chamber 4 by an axially movable wall 2. A control valve 6 that is operable by an operating rod 5 is accommodated in a control housing 7 which is sealed and guided in the booster housing 1 and carries the movable wall 2. Control valve 6 has a first sealing seat 8 on the control housing 7, a second sealing seat 9 on a control piston 10 connected to the operating rod 5 and a valve member 11 which cooperates with the two sealing seats 8, 9 and is pressed against the sealing seats 8, 9 by a valve spring 13 that is supported on a holding ring 12. Working chamber 3 is connectable to vacuum chamber 4 by way of a channel 14 which extends laterally in the control housing 7. In order to be able to connect the working chamber 3 to the atmosphere when the control valve 6 is operated, a radially extending channel 15 is provided in the control housing 7.

The brake force is transmitted to an operating piston of a master brake cylinder (not shown) by way of a rubber elastic reaction plate 17 that abuts frontally on a front part 16 of the control housing 7, and a push rod 18. The movable wall 2 is pushed into its initial position by a resetting spring 19. Further, there is provision of a second compression spring 20 which is supported on the operating rod 5, on the one hand, and on the holding ring 12, on the other hand.

In order to initiate an independent actuation of the brake force booster irrespective of the operating rod 5, a third sealing seat 21 is arranged radially between the first sealing seat 8 and the second sealing seat 9 on a sleeve 23 that is slidable by an electromagnet 22. Electromagnet 22 is composed of a coil 25 that is arranged in a guide member 24 connected to the control piston 10, and an armature 26 slidable in the coil and being in a forcetransmitting connection to the sleeve 23. A closure member 27 is arranged on the front part of the guide member 24. Between the closure member 27 and the reaction plate 17, a transmission ratio disc 28 is arranged so as to be slidable within limits, the movement of said disc in opposition to the actuating direction being limited by an annular surface 29 provided in the front part 16.

A brake force booster of a design of this type has been described in detail in WO 94/11226 mentioned hereinabove. The said publication is therefore referred to for further details.

In contrast to the prior art brake force booster, the brake force booster of the present invention includes as a special feature a sensor 30 for detecting the relative displacement between the control housing 7 and the valve piston 10. In the embodiment shown in FIG. 1, the sensor 30 is a non-contact sensor with a first sensor element 31 on the guide member 24 rigidly connected to the valve piston 10, and with a second sensor element 32 which is arranged, opposite to the first sensor element 28, on the inside wall of a part 33 rigidly connected to the control housing 7. A sensor of this type permits a very simple control of the brake assist function because the signal of the sensor can be used for activating as well as deactivating the electromagnet and, hence, the brake assist system. This means that the brake assist mode can be triggered and also terminated only on the basis of signals of one single sensor.

Figure 2:
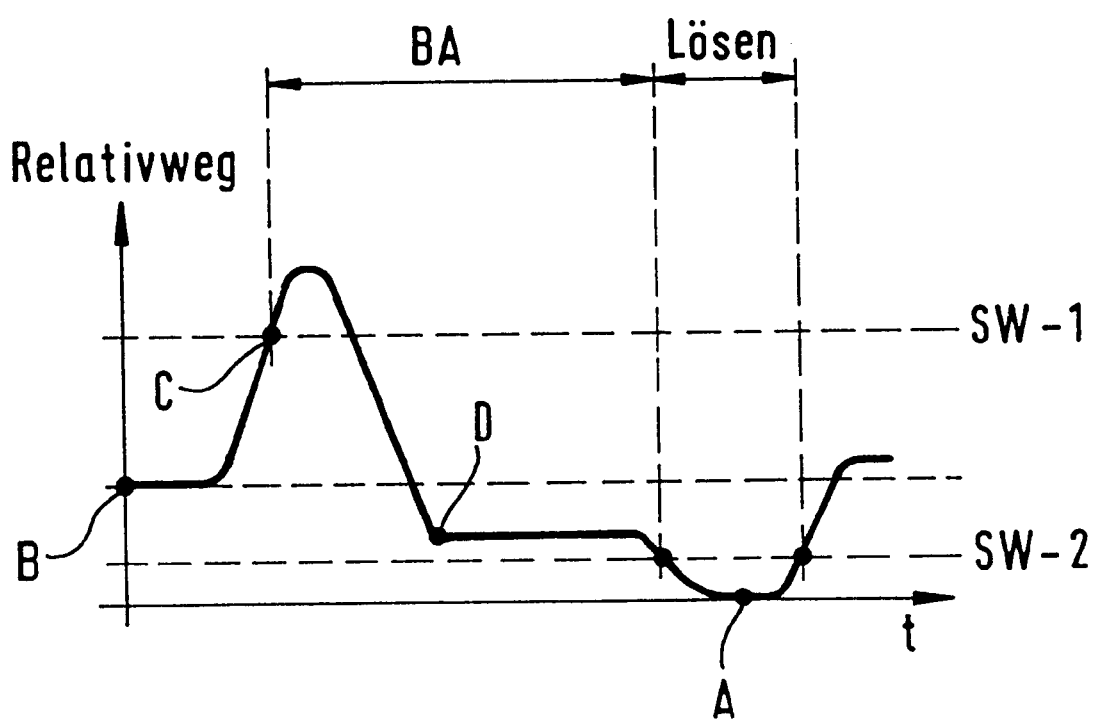
FIG. 2 is a diagram to illustrate an electrical actuation of the brake force booster of the present invention.

FIG. 2 is a diagram which shows an example for the electric actuation of the brake force booster of the present invention as a function of the relative displacement detected by the sensor 30. Point A in this diagram designates a condition where the valve piston 10 has adopted its maximum retracted position in relation to the control housing 7. This condition can be achieved by energization of the electromagnet 22 without the action of a driver's foot. This causes the sliding sleeve 23 to displace from the armature 26 according to FIG. 1 to the right, thereby urging with its sealing seat 21 the valve member 11 rearwards. The result is that air flows in from the outside into the working chamber 3, and the control housing 7 is displaced forwards due to the pressure difference between the working chamber 3 and the vacuum chamber 4. Initially, the valve piston 10 remains in its stationary position until it is entrained by the control housing 7 by way of the crossbar 34. This position in which the valve piston 10 is in its maximum retracted position in relation to the control housing 7 can be determined as zero point of the sensor 30 (point A).

In the ready position of the brake force booster designated by point B in FIG. 2, the control housing 7 and the valve piston 10 bear against the booster housing 1 by way of the crossbar 34, while the closure member 16 of the valve piston bears against the transmission ratio disc 28 which, in turn, is spaced from the reaction plate 17 and from the annular surface 29 of the front part 17. In this position, the valve piston 10 compared to the position of point A, is advanced by a distance further into the control housing 7, or the latter is shifted back in relation to the valve piston 10 by the compression spring 19.

When the brake pedal is applied by the driver in the ready position of the brake force booster, the operating rod 5 and the valve piston 10 are shifted further into the control housing 7 depending on the actuating speed, with the result that the relative displacement is increased. This is shown in FIG. 2 by the rise of the curve.

When the detected relative displacement in point C exceeds an upper threshold value characterized by SW-1, the electromagnet 22 is energized to activate the brake assist system and the full servo force of the brake force booster is introduced. Because the driver's pedal force is no longer proportional to the output force of the brake force booster in this condition, the valve piston 10 is shifted back by way of the reaction plate 17 and the transmission ratio disc 28 until the transmission ratio disc 28 moves into abutment on the annular surface 29 of the control housing front part 16. The return movement of the valve piston 10 in relation to the control housing 7 also causes reduction of the relative displacement until a point D. Due to construction, this point is always between point A and point B. The distance between point B and point D is determined geometrically by the distance of the rear side of the transmission ratio disc 28 from the annular surface 29 of the control housing front part 16 during the ready position of the brake force booster.

When, after activation of the brake assist system, the point D is passed by in the direction of A by release of the brake pedal, this means that the driver wishes to stop the braking operation, and the magnet is deactivated when the value of the relative displacement falls below a lower threshold value that is referred to as SW-2 in FIG. 2. The magnet current may be disconnected abruptly or in response to the relative displacement detected by the sensor. Due to control of the magnet current proportional to the sensor signal, the driver may reduce and also reincrease the braking pressure in a controlled manner, without the brake assist mode being deactivated completely. This permits pressure control in the brake assist mode which is almost independent from force. By releasing the brake pedal in the brake assist mode the driver may reduce the braking pressure in a controlled manner without abruptly interrupting the brake assist function. When the driver wishes to reincrease the previously reduced braking pressure in the brake assist mode, he or she increases the pedal force until the portion of the pedal force, analogous to the conventional brake force booster function, is proportional to the pressure of the master cylinder, with the result of a smooth transition to the regular braking function. When the driver reaches a panic situation again in the brake assist mode with a previously reduced braking pressure, the electromagnet will be energized again with the full switch-on current strength after the connecting threshold has been exceeded, with the result of the full boosting power being available again.

Figure 3:
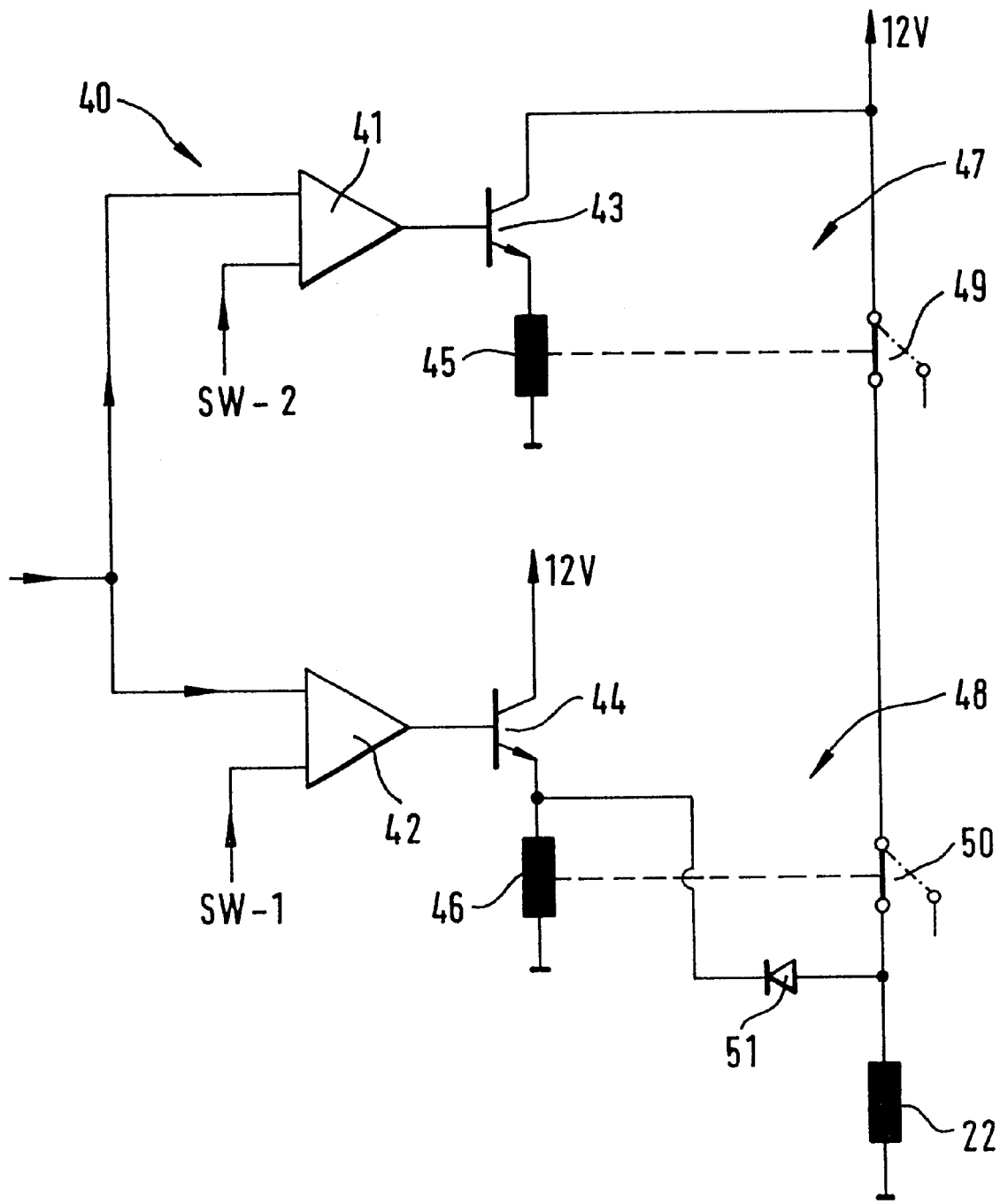
FIG. 3 is an electric circuit for the actuation of the electromagnet in the brake force booster of the present invention.

The embodiment of FIG. 3 shows a circuit diagram of a simple electric circuit 40 for the actuation of the brake force booster of the present invention. The circuit includes two comparators 41 and 42. Applied to one of the inputs of the two comparators 41 and 42 is in each case the signal of the sensor 30 which detects the relative displacement between the control housing 7 and the valve piston 10. A signal corresponding to the disconnecting threshold SW-2 in FIG. 2 is applied to the comparison input of the first comparator 41, and a signal corresponding to the connecting threshold SW-1 is applied to the comparison input of the second comparator 42. Both comparators 41 and 42 actuate a magnetic coil 45 and 46 of a relay 47 or 48 by way of each one transistor 43 and 44. The switches 49 and 50 of the relay 47 or 48 are connected in series with the electromagnet 22. Branching off from the connecting line between the switch 50 and the electromagnet 22 is an electrical connection which leads to the inlet side of the magnetic coil 46 and in which a diode 51 is arranged. During the ready position of the brake force booster, the signal of the travel sensor 30 principally exceeds the disconnecting threshold SW-2 so that the comparator 41 makes the transistor 43 become conductive, and switch 49 is closed. When the connecting threshold SW-1 is reached upon a quick brake application, the comparator 42 will switch so that the transistor 44 becomes conductive and the switch 50 is switched as well. Because now both switches 49 and 50 are closed, the electromagnet 22 is energized. Even if the signal at the comparator 42 falls below the connecting threshold SW-1, switch 50 remains closed because the magnetic coil is further energized by means of the diode 51. Only if the signal of the sensor 30 drops below the disconnecting threshold SW-2 will the current supply to the relay 48 be interrupted by relay 47. Energization of the electromagnet 22 is interrupted and the brake assist mode deactivated by these means. For a new activation of the brake assist mode, the signal of sensor 30 is required to adopt the value of the connecting threshold SW-1 again.

Thus, the brake force booster of the present invention can be actuated by an electric circuit of a very simple design in order to activate and deactivate the brake assist system. A circuit of this type does not need an additional control device and can be provided directly on the brake force booster, or can be integrated in it. By extending the electronic circuit by means of a simple proportional component in the area of the release function, it is possible to avoid the abrupt withdrawal from the brake assist function which is criticized in conventional brake force boosters, and to render it largely imperceptible to the driver.

What is claimed is:

1. Brake force booster for automotive vehicles, comprising:
    a booster housing whose interior space is subdivided by a movable wall into a working chamber and a vacuum chamber,
    a control housing which carries the movable wall and in which a control valve is arranged for controlling a pressure differential that acts upon the movable wall, the control valve operable by an operating rod by way of a valve piston and by an electromagnet,
    a sensor which detects the relative displacement between the valve piston and the control housing, wherein the electromagnet is activated and controlled in dependence on the relative displacement between the valve piston and the control housing,
    further including an electronic actuating device which actuates the electromagnet according to the output signals of the sensor,
    wherein the electronic actuating device comprises two comparators, and the signal of sensor is applied respectively to one of the inputs of the two comparators, and a signal is applied to the comparison input of one of the two comparators which corresponds to a disconnecting threshold, and a signal is applied to the comparison input of the other comparator which corresponds to a connecting threshold,
    wherein the two comparators activate respective relays by way of a transistor, wherein the relays are connected in series to the electromagnet.

2. Brake force booster as claimed in claim 1, wherein the electromagnet is adapted to be activated when a predetermined first relative displacement is exceeded.

3. Brake force booster as claimed in claim 2, wherein the actuating current of the electromagnet in the activated condition is variable in response to the relative displacement detected by the sensor or a relative displacement gradient.

4. Brake force booster as claimed in claim 2, wherein the first relative displacement predetermined for the activation of the electromagnet is variable in dependence on a vehicle deceleration, a vehicle speed, a braking pressure, or a time which has passed after since an application of a brake pedal.

5. Brake force booster as claimed in claim 1, wherein the electromagnet is adapted to be deactivated when the amount of displacement falls below a predetermined second relative displacement.

6. Brake force booster as claimed in claim 1, wherein the sensor is a non-contact sensor.

7. Brake force booster as claimed in claim 1, wherein the sensor comprises a first sensor element on a guide member rigidly connected to the valve piston and a second sensor element on a part connected to the control housing.

8. Brake force booster as claimed in claim 1, wherein the sensor is a Hall sensor.

9. Brake force booster as claimed in claim 1, further including a connecting line which leads to an inlet side of a magnetic coil of the relay and in which a diode is arranged branches off from a connecting line between the switch of the relay and the electromagnet.

10. Method for actuating a brake force booster as claimed in claim 1, wherein the electromagnet is activated when the signal of the sensor is equal to or in excess of a connecting threshold, and in that the electromagnet is deactivated when the signal of the sensor is lower than a disconnecting threshold, with the disconnecting threshold being lower than the connecting threshold.

11. Method as claimed in claim 10, wherein the actuating current of the electromagnet in the activated condition is controlled in dependence on the relative displacement detected by the sensor or a relative displacement gradient.

* * * * *